Jan. 6, 1953 C. B. JOHNSON 2,624,395
BABY SEAT
Filed Sept. 13, 1947
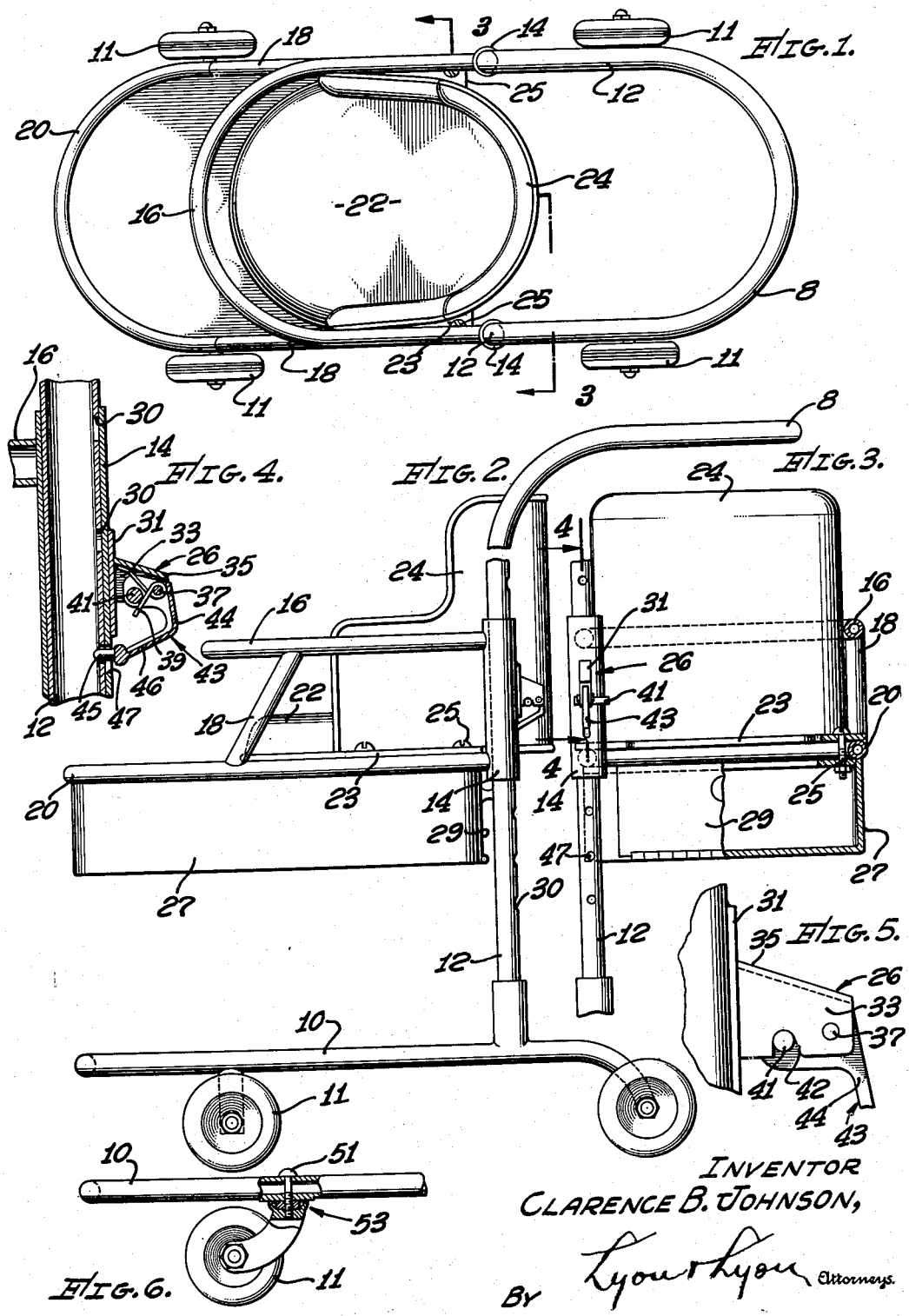
INVENTOR
CLARENCE B. JOHNSON,
BY Lyon & Lyon
Attorneys.

Patented Jan. 6, 1953

2,624,395

UNITED STATES PATENT OFFICE 2,624,395

BABY SEAT

Clarence B. Johnson, Long Beach, Calif.

Application September 13, 1947, Serial No. 773,893

8 Claims. (Cl. 155—38)

My invention relates to baby seats and particularly to a baby seat of the perambulator type whereby the baby may be conveyed thereon from place to place.

The object of my invention is to provide a seat simply and safely adjustable as to height, equally adaptable as either a perambulator or as a high chair.

A further object of my invention is to provide such seat or high chair protected by sturdy guard rails, such guard rails comprising of the frame of the conveyance and being adapted to protect the baby during perambulation.

A still further object of my invention is to provide a device, while yet adjustable as to height and permitting the baby to sit in a raised position, having a low center of gravity and thus minimizing any risk of upset.

Various other objects and advantageous features of this invention may be had from the following description, and the preferred embodiment thereof may be seen in the accompanying drawings, in which:

Figure 1 shows a top plan view of a perambulating baby seat or high chair incorporating my invention.

Figure 2 shows a side elevational view thereof.

Figure 3 shows a rear elevational view of the seat adjusting means taken on line 3—3 of Figure 1.

Figure 4 shows a sectional view taken on the line 4—4 of Figure 3.

Figure 5 shows a partial elevational view of the latch housing.

Figure 6 shows partly in section a modified view of a front wheel.

Referring to the drawings, my device comprises a base frame 10, which as shown may be of rounded tubular form and preferably constructed of metal, provided with the wheels 11 to permit perambulation. Welded to the frame member 10 are the vertical posts 12 which likewise are preferably of tubular metal and which curve at their upper portions to transversely extend to a rounded handle 8.

Riding upon the posts 12 are the sleeves 14, which have welded thereto the rounded guard member 16 which may again be of tubular metal construction. The connecting members 18 are welded to the said guard member 16 and in turn are welded to a second curved tubular guard member 20, which is welded to the sleeves 14 and which extends forward of the member 16.

A seat 22 provided with a round back rest 24 is supported by a cross member 23 which forms an extension of the bottom of the said seat, which, by the bolts 25 or in similar common fashion, is affixed to the tubular member 20, said bolts likewise supporting a box-like structure 27 having a hinged cover 29 and providing storage space for packages, groceries and the like.

Welded to the sleeves 14 are two pin-carrying members 26, each of which comprises a plate 31 having a vertically extended channel having a top 35 thereupon. Carried by said channel 33 is a laterally extended pin 37 carrying a spring 39, one end of which abuts against the said top 35 and the other end of which bears against a stud 41 projecting laterally from a latch 43. The latch 43, which comprises a shank 44 and a depending arm 46, is supported pivotally on the pin 37, the shank and arm leaving a space for insertion of the operator's finger for a purpose to be later described. On the channel 33 are provided facing grooves 42 adapted to receive the stud 41. The extremity of the latch 46 has a stud 45 which may, through the sleeve holes 47, coact with the holes 30 in the post 12. Each sleeve 14 is provided with the aforementioned latch assembly and each post 12 has a vertically aligned series of holes 30 for coaction with such latches.

Figure 6 shows a modification of the ordinary front wheel means 11 in providing with the bolt 51 a ball bearing assembly 53 resulting in a pivoting wheel whereby turning is aided during perambulation.

In operation the baby may be lowered past the guard member 16 to sit upon the seat 22, resting his back on the back rest 24.

By virtue of the wheels 11 the baby may be conveyed from place to place; and, if desired, as during marketing, the mother may utilize the compartment 27 to carry packages or other objects.

The seat is adjusted by inserting the fingers in the two latches 43 between the shanks 44 and arms 46 and removing the studs 45 from the holes 30, after which the sleeves 14, and thus the seat itself, may be raised or lowered upon the posts 12, after which the studs 45 may be reinserted in the proper holes 30.

It will be noted that by virtue of the extended guard members 16 and 20, and particularly guard member 20, when the baby is seated upon the seat 22 the center of gravity approximates a position centering between the wheels 11 substantially interfering with any possible upsetting of the vehicle rearwardly or forwardly by virtue of pressure on the handle 8. Moreover, the guard members 16 and 20 serve to form bumpers to prevent injury to the child in the event of accidental collision.

Having fully described my invention, it is to be understood that I do not wish to be limited to the details herein set forth, but my invention is of the full scope of the appended claims.

I claim:

1. A device of the class described comprising a wheel-carrying base frame; vertical posts carried thereby; sleeves slidably carried by said posts; an upper curved guard member carried by said sleeves; a lower curved guard member carried by said sleeves; and a rounded seat supported by said guard members.

2. A device of the class described comprising a wheel-carrying base frame; vertical posts carried thereby; sleeves slidably carried by said posts; an upper curved guard member carried by said sleeves, a lower curved guard member carried by said sleeves; connecting members between said guard members and a rounded seat supported by said guard members.

3. A device of the class described comprising a wheel-carrying base frame; vertical posts carried thereby; said posts having holes drilled therein; sleeves slidably carried by said posts, said sleeves carrying pins adapted to be received in said holes; an upper curved guard member carried by said sleeves; a lower curved guard member carried by said sleeves; and a rounded seat supported by said guard members.

4. A device of the class described comprising a wheel-carrying base frame; vertical posts carried thereby; said posts having holes drilled therein; sleeves slidably carried by said posts, said sleeves carrying pins adapted to be received in said holes; an upper curved guard member carried by said sleeves; a lower curved guard member carried by said sleeves; connecting members positioned between said guard members and attached thereto; and a rounded seat supported by said guard members.

5. A device of the class described comprising a wheel-carrying base frame; posts extending vertically therefrom and terminating in a handle; two series of holes disposed lineally respectively in said posts in vertical direction, sleeves slidably carried by said posts; latches carried on said sleeves; pins carried by said latches and adapted to be received into said holes; an upper curved guard member carried by said sleeves; a lower curved guard member carried by said sleeves; connecting members positioned between said guard members and attached thereto; and a seat supported by said sleeves.

6. A device of the class described comprising a wheel-carrying base frame; posts extending vertically therefrom and terminating in a handle; two series of holes disposed lineally respectively in said posts in vertical direction; sleeves slidably carried by said posts; latches carried on said sleeves; pins carried by said latches and adapted to be received into said holes; an upper curved guard member carried by said sleeves; a lower curved guard member carried by said sleeves; and a seat supported by said sleeves.

7. A device of the class described comprising a wheel-carrying base frame; vertical posts carried thereby; sleeves slidably carried by said posts; an upper guard member carried by said sleeves; a lower guard member carried by said sleeves; and extending forwardly of said upper guard member; and a rounded seat supported by said guard members.

8. A device of the class described comprising a wheel-carrying base frame; vertical posts carried thereby; said posts having holes drilled therein; sleeves slidably carried by said posts; said sleeves carrying pins adapted to be received in said holes; an upper guard member carried by said sleeves; a lower guard member carried by said sleeves; and extending forwardly of said upper guard member; and a seat supported by said guard members.

CLARENCE B. JOHNSON.

REFERENCES CITED

The following references are of record in the file of this patent:

UNITED STATES PATENTS

| Number | Name | Date |
| --- | --- | --- |
| 338,232 | Kenna | Mar. 16, 1886 |
| 872,498 | Cleveland | Dec. 3, 1907 |
| 2,291,247 | McArthur | July 28, 1942 |
| 2,374,182 | Duke | Apr. 24, 1945 |
| 2,383,173 | Watter | Aug. 21, 1945 |
| 2,433,969 | Wood | Jan. 6, 1948 |
| 2,439,163 | Farmer | Apr. 6, 1948 |